(12) United States Patent
Chen et al.

(10) Patent No.: US 11,050,562 B2
(45) Date of Patent: Jun. 29, 2021

(54) TARGET DEVICE ATTESTATION USING A TRUSTED PLATFORM MODULE

(71) Applicant: HEWLETT PACKARD ENTERPRISE DEVELOPMENT LP, Houston, TX (US)

(72) Inventors: Liqun Chen, Bristol (GB); Carey Huscroft, Roseville, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 478 days.

(21) Appl. No.: 15/756,978

(22) PCT Filed: Jan. 29, 2016

(86) PCT No.: PCT/US2016/015785
§ 371 (c)(1),
(2) Date: Mar. 1, 2018

(87) PCT Pub. No.: WO2017/131775
PCT Pub. Date: Aug. 3, 2017

(65) Prior Publication Data
US 2018/0241560 A1    Aug. 23, 2018

(51) Int. Cl.
*H04L 9/32* (2006.01)
*H04L 9/08* (2006.01)
(Continued)

(52) U.S. Cl.
CPC ............ *H04L 9/0877* (2013.01); *G06F 21/57* (2013.01); *G06F 21/577* (2013.01);
(Continued)

(58) Field of Classification Search
CPC . H04L 9/0877; H04L 9/30; H04L 9/32; G06F 21/577
(Continued)

(56) References Cited

U.S. PATENT DOCUMENTS 8,812,876 B1 * 8/2014 Ginzton .............. G06F 12/1408
713/193
8,909,928 B2   12/2014 Ahmad et al.
(Continued)

FOREIGN PATENT DOCUMENTS

WO    WO-2014038926 A1    3/2014

OTHER PUBLICATIONS

Frederic Stumpf, "Leveraging Attestation Techniques for Trust Establishment in Distributed Systems," Dissertation, 2010, pp. 1-236, Technischen Universität at Darmstadt genehmigte, Germany.
(Continued)

*Primary Examiner* — Jeffrey C Pwu
*Assistant Examiner* — Samuel Ambaye
(74) *Attorney, Agent, or Firm* — Hewlett Packard Enterprise Patent Department

(57) ABSTRACT

Example implementations relate to attestation. For example, in an implementation, a target device attestation request is transmitted to a target device, where the target device attestation request includes an identity-based encryption (IBE) ciphertext and a retrieval index. The ciphertext is a nonce encrypted using a trusted platform module (TPM) public key together with an IBE public key. The TPM public key is retrieved from a TPM of the target device, and the IBE public key is an expected value presumed to be stored at the TPM.

17 Claims, 6 Drawing Sheets

(51) Int. Cl.
*G06F 21/57* (2013.01)
*H04L 9/14* (2006.01)
*H04L 9/30* (2006.01)

(52) U.S. Cl.
CPC .............. *H04L 9/0866* (2013.01); *H04L 9/14* (2013.01); *H04L 9/30* (2013.01); *H04L 9/3242* (2013.01); *H04L 9/3247* (2013.01); *G06F 2221/034* (2013.01); *H04L 2209/127* (2013.01)

(58) Field of Classification Search
USPC ........................................................ 713/171
See application file for complete search history.

(56) References Cited

U.S. PATENT DOCUMENTS

| 2007/0226505 | A1 | 9/2007 | Brickell |
| 2008/0244569 | A1 | 10/2008 | Challener et al. |
| 2008/0263357 | A1* | 10/2008 | Boyen .................... H04L 9/083 713/168 |
| 2008/0320308 | A1 | 12/2008 | Kostiainen et al. |
| 2009/0019285 | A1* | 1/2009 | Chen ..................... G06F 21/575 713/175 |
| 2010/0082987 | A1 | 4/2010 | Thom et al. |
| 2012/0151223 | A1 | 6/2012 | Conde Marques et al. |
| 2012/0331285 | A1 | 12/2012 | Bangerter et al. |
| 2014/0115578 | A1* | 4/2014 | Cooper ............... H04L 63/1416 718/1 |

OTHER PUBLICATIONS

International Search Report and Written Opinion, International Application No. PCT/US2016/015785, dated Oct. 18, 2016, pp. 1-8, KIPO.

Tamleek Ali et al., "Scalable, Privacy-preserving Remote Attestation in and Through Federated Identity Management Frameworks," Apr. 2010, pp. 1-8, IEEE.

Zhi Guan et al., "Efficient Identity-Based Key Issue with TPM," The 9th International Conference for Young Computer Scientists, Nov. 2008, pp. 2354-2359, IEEE.

* cited by examiner

TARGET DEVICE ATTESTATION USING A TRUSTED PLATFORM MODULE

BACKGROUND

Attestation is a mechanism by which a party may verify whether an electronic device with which the party is communicating is intact, trustworthy, and has not been breached or tampered with. The party may wish to prove the identity and trustworthiness of the electronic device to protect certain communications, such as sensitive or private data. The electronic device may provide a digitally signed platform configuration register value as attestation.

BRIEF DESCRIPTION OF THE DRAWINGS

Various examples will be described below with reference to the following figures.

DETAILED DESCRIPTION

Figure 1:
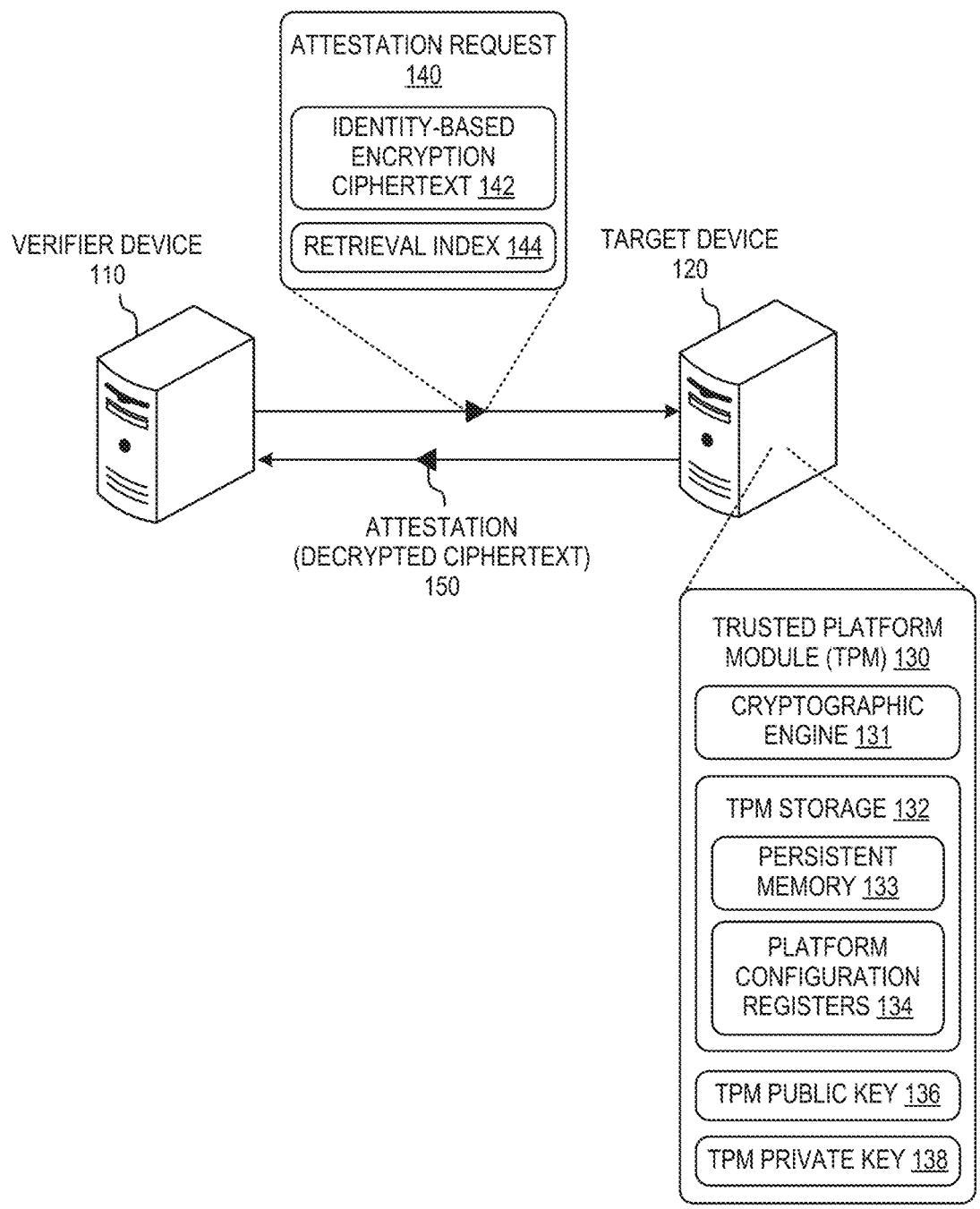
FIG. 1 is a block diagram depicting device attestation using identity-based encryption, according to an implementation.

In trusted computing, attestation is a mechanism by which a party may verify whether an electronic device, such as a computer, with which the party is communicating is intact, trustworthy, and has not been breached or tampered with. In other words, attestation allows an electronic device to prove its identity and trustworthiness to the verifying party. The party may wish to prove the identity and trustworthiness of the electronic device to protect certain communications, such as sensitive or private data.

The party may be referred to herein as a verifier. The electronic device to be verified by the party may be referred to herein as a target device. The party may operate a computing device (e.g., a desktop computer, a laptop computer, a workstation, a terminal, etc.), also referred to herein as a verifier device, to communicate with and request attestation from the target device. In some cases, attestation may be performed remotely over a wired and/or wireless network connection.

An example implementation of attestation involves the use of a trusted platform module (TPM) installed on the target device. A TPM may comprise an electronic component, such as a chip or a microcontroller that includes a hardware-based cryptographic engine and storage. The TPM storage may include persistent memory for storing information such as cryptographic keys. The TPM storage also includes platform configuration registers (PCR), which store measurements of the target device made by or provided to the TPM. Example measurements may relate to how the target device is configured, including aspects such as BIOS (basic input/output system), operating system (OS), applications, etc. The measurements may be computed as a hash chain and stored as a PCR value at a particular PCR index (or indices) within the PCR.

Thus, values stored in the PCR may provide cryptographic evidence of the state of the target device itself and may be useful for attestation. The target device may be deemed to be intact and trustworthy if the PCR value matches an expected value. On the other hand, if the PCR value does not match an expected value, the target device may be deemed to not be intact or trustworthy. Non-matching PCR values may be the result of viruses or malware, the target device not being configured properly (e.g., does not have recommended updates, security patches, etc. installed), or the target device having unauthorized modifications.

In one example, the TPM provides attestation of the target device by digitally signing the PCR value using a private key and transmitting the signed PCR value to the verifier device. The verifier device then validates the signature (using the TPM's public key) and compares the signed PCR value against an expected PCR value. Although this process allows the verifier to determine whether the target device is trustworthy, the digital signature directly links the target device to sensitive information and allows the verifier to share the attestation process with a third party, thus violating the privacy of the target device.

Various approaches have been proposed to preserve the privacy of the target device during attestation. One approach utilizes a trusted third party, namely a privacy certificate authority, to provide certified keys to the TPM that are not directly traceable to the target device. Another example approach is known as direct anonymous attestation (DAA), wherein an initial (i.e., one-time) interaction between the TPM and a DAA issuer provides a DAA private key to the TPM for attestation by an anonymous digital signature rather than a conventional digital signature, thus hiding the TPM's public key. However, the foregoing approaches rely on a third party to hide the identity of the TPM and a complex system of keys. Moreover, the foregoing approaches provide evidence to the verifier that a TPM has signed a certain PCR value.

Example techniques of the present disclosure may relate to target device attestation using an identity-based encryption (IBE) scheme. For example, in some implementations, a verifier device may generate a nonce, retrieve a TPM public key, designate an IBE public key based on an expected value presumed to be stored at the TPM (such as a PCR value), encrypt the nonce using the TPM public key and the IBE public key together to generate an IBE ciphertext, and transmit to the TPM a target device attestation request that includes the IBE ciphertext and a retrieval index corresponding to the expected value (e.g., the PCR index where the PCR value is expected to be stored). In response, the TPM may retrieve a value stored in TPM storage at the retrieval index, extract a decryption key using a TPM private key and the retrieved value, decrypt the ciphertext using the decryption key to generate decrypted ciphertext (i.e., the nonce created by the verifier), and send the decrypted ciphertext (i.e., the nonce) back to the verifier device as attestation of the target device. Accordingly, the systems and techniques of the present disclosure may be useful in providing privacy-preserving attestation in a simplified manner, without involving a third party and without providing any evidence to the verifier that the transaction between the verifier and the TPM exists, since all the messages transmitted during the transaction (i.e., the retrieval index, the ciphertext, and the decrypted ciphertext) can be simulated by the verifier or verifier device itself.

Referring now to the figures, FIG. 1 is a block diagram depicting device attestation using identity-based encryption, according to an implementation. FIG. 1 depicts a verifier device 110 that can communicate with a target device 120 via, for example, a wired or wireless network. The verifier device 110 and the target device 120 may each be an electronic device such as, for example, a server, a workstation, a desktop computer, a laptop computer, a tablet computer, a mobile phone, networking equipment, or another type of electronic device, although the verifier device 110 and the target device 120 need not be the same type of computing device.

The target device 120 includes a trusted platform module (TPM) 130. For example, the TPM 130 may be an electronic component, such as chip or microcontroller, which can be soldered on to a motherboard of the target device 120, or may be included in another electronic component or chip of the target device 120. The TPM 130 may include a hardware-based cryptographic engine 131 that executes cryptographic functions (e.g., RSA key generation) and hashing algorithms (e.g., a member of the Secure Hash Algorithm family, including SHA-1, SHA-2, SHA-3). The TPM 130 also has storage 132 that may include persistent memory 133 and platform configuration registers (PCR) 134. The persistent memory 133 may store various information, including passwords, certificates, or encryption keys.

The PCR 134 stores PCR values addressable by PCR index (or indices). For example, a PCR value may be a hash chain of measurements about the configuration of the target device 120. In some implementations, the measurements are made throughout stages of the target device 120 start up sequence (e.g., from BIOS, to OS, to applications, etc.), and a measurement from each stage (e.g., also referred to as a digest) is cryptographically added (e.g., SHA-1) to a hash chain stored in the PCR 134. Such a hash chain representing cumulative system measurements may be non-commutative. Also, a PCR value may be deterministic, in that a particular target device configuration or a particular start up sequence for the target device 120 will result in the same PCR value. Moreover, in some implementations, a PCR value can be generated (i.e., simulated) for any given configuration of the target device 120, by a device other than the target device 120, using standardized specifications and hash algorithm (e.g., SHA family algorithm).

The TPM 130 also includes a TPM public key 136 and a TPM private key 138. In some implementations, the keys 136, 138 may be stored in TPM storage 132. Generally, the TPM 120 may provide the TPM public key 136 to a requesting party, such as the verifier device 110, while the private key 138 remains secure and is not shared outside the TPM 130. In some implementations, the TPM public key 136 and the TPM private key 138 belong to a pair called an endorsement key, which is unique to the TPM 130 and is built into the TPM 130 at the time of manufacture. Alternatively, the TPM public key 136 and the TPM private key 138 may be a key in the endorsement key hierarchy.

The verifier device 110 may check whether the target device 120 is intact and trustworthy by transmitting an attestation request 140 based on an IBE scheme. Before describing attestation by the verifier device 110 to the target device 120, identity-based encryption will first be described. IBE may be used to encrypt data between a sender and a receiver. The sender encrypts data using an IBE public key generated from some information about the identity of the receiver, such as an email address of the receiver. The receiver, by authority of its identity, retrieves an IBE private key corresponding to its identity from a key manager and decrypts the data.

To verify the state of the target device 120, the verifier device 110 sends to the TPM 130 an attestation request 140 that includes an IBE ciphertext 142 and a retrieval index 144. As will be described further herein below (e.g., with respect to FIG. 2), the IBE ciphertext 142 is a nonce encrypted using the TPM public key 136 and some information identifying or associated with the target device 120. In particular, the information may be an expected value presumed to be stored at the TPM 130 at a location in TPM storage 132 addressable by the retrieval index 144. In response, the TPM 130 decrypts the IBE ciphertext 142 using the TPM private key 138 combined with a value retrieved from TPM storage 132 using the retrieval index 144. The TPM 130 sends the resulting decrypted ciphertext 150 back to the verifier device 110 as attestation of the target device 120. If the retrieved value used by the TPM 130 to decrypt the IBE ciphertext 142 matches the expected value used by the verifier device 110 to encrypt the nonce, the decrypted ciphertext 150 will match the nonce and the verifier device 110 can trust that the target device 120 holds the expected value.

More particularly, the verifier device 110 may select as the expected value an expected PCR value. In other words, the verifier device 110 will trust the target device 120 if the target device 120 has a configuration that would generate the expected PCR value. In this example, the IBE ciphertext 142 would be a nonce encrypted using the TPM public key 136 and the expected PCR value together, and the retrieval index 144 would be the PCR index where the expected PCR value is stored. The target device 120 retrieves the PCR value stored at the PCR index, decrypts the IBE ciphertext 142 using the TPM private key 138 and the retrieved PCR value together, and sends the decrypted ciphertext 150 back to the verifier device 110. If the decrypted ciphertext 150 matches the nonce, the verifier device 110 can be assured that the target device 120 has the expected PCR value and thus a trusted system configuration.

Figure 2:
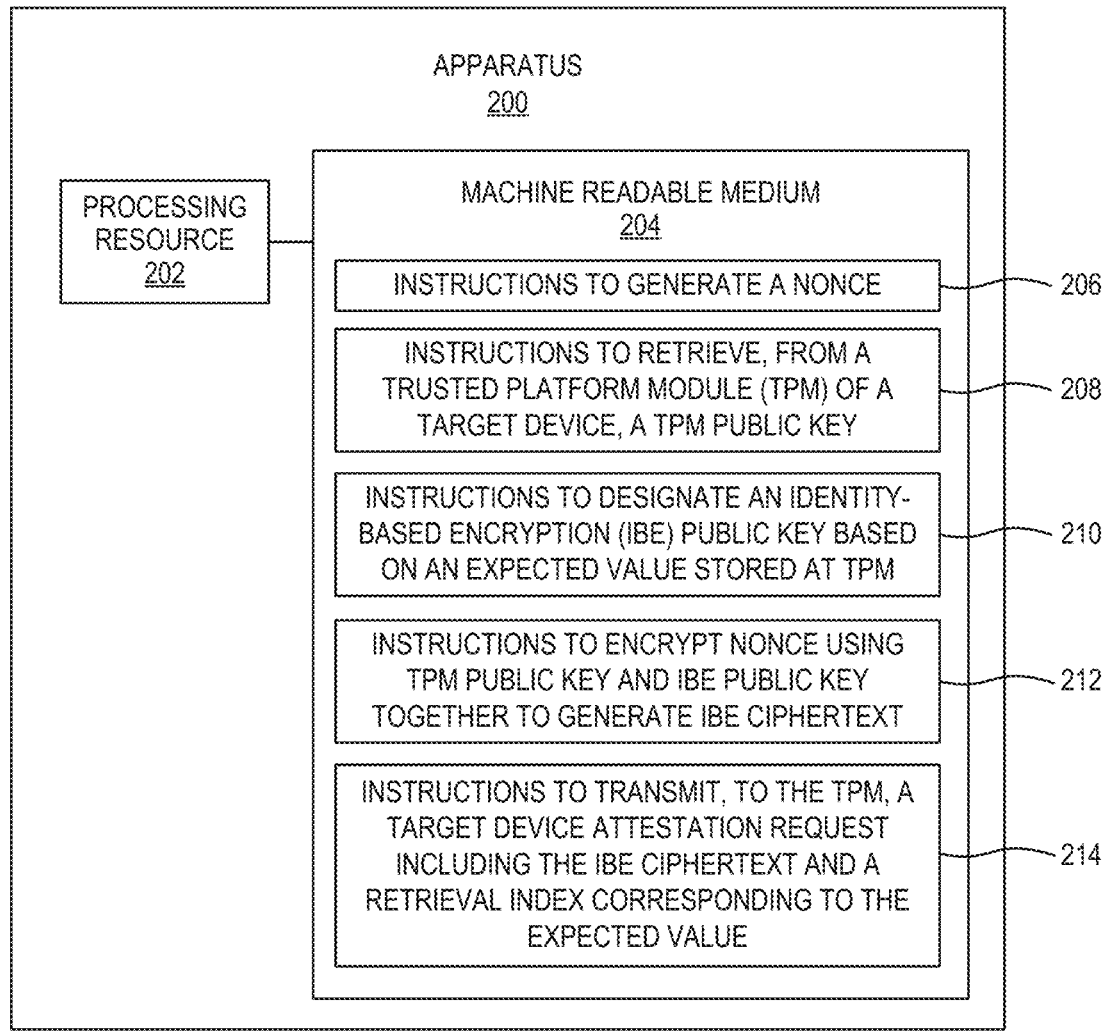
FIG. 2 is a block diagram depicting an example apparatus that transmits a device attestation request, according to an implementation.

FIG. 2 is a block diagram depicting an example apparatus 200 that transmits a device attestation request, according to an implementation. The apparatus 200 includes a processing resource 202 coupled to a non-transitory machine readable medium 204 storing (or encoded with) instructions 206, 208, 210, 212, 214. The term "non-transitory" as used herein does not encompass transitory propagating signals.

In some implementations, the processing resource 102 may be a microcontroller, a microprocessor, central processing unit core(s), an application-specific integrated circuit (ASIC), a field programmable gate array (FPGA), a programmable logic device (PLD), and/or other hardware device suitable for retrieval and/or execution of instructions 206, 208, 210, 212, 214 stored on the machine readable medium 204, which may be, e.g., random access memory (RAM), read-only memory (ROM), electrically erasable programmable read-only memory (EEPROM), flash memory, a hard disk drive, etc. The instructions 206, 208, 210, 212, 214, when executed, cause the processing resource 202 to perform the functionality described herein. Additionally or alternatively, the processing resource 202 may include one or more hardware devices, including electronic circuitry, for implementing functionality described herein.

The apparatus 200 may be in communication with a target device by way of a wired and/or wireless network. In some implementations, the apparatus 200 may form part of a computing device, and more particularly, the apparatus 200 may serve as or form part of the verifier device 110 described above. The target device may be analogous in many respects to the target device 120, and may include a TPM analogous to the TPM 130. The apparatus 200 may execute the instructions 206, 208, 210, 212, 214 to test the state of the target device and verify the trustworthiness of the target device, for example, prior to certain communications with the target device (e.g., private and/or sensitive communications).

Instructions 206, when executed, cause the processing resource 202 to generate a nonce, which is a single-use arbitrary (e.g., random or pseudo-random) number. Instructions 208, when executed, may cause the processing resource 202 to retrieve a TPM public key from the TPM of the target device.

Instructions 210, when executed, cause the processing resource 202 to designate an IBE public key based on an expected value presumed to be stored at the TPM of the target device. In some implementations, the expected value may be information that the apparatus 200 requires the TPM to hold or be able to produce as a prerequisite for further communications. Such information may be related to characteristics of the target device. The expected value may be a publicly available value or a value derivable from public information. For example, the expected value may be an expected target device platform configuration register (PCR) value, that is, a hash value that represents a target device configuration trusted or expected by the apparatus 200 or a user thereof. In some implementations, the apparatus 200 may designate the IBE public key by receiving the expected value as a file, user-defined value, or calculating the expected value from an input (e.g., calculating the PCR value via a predetermined hash algorithm from an expected target device configuration).

Instructions 212, when executed, cause the processing resource 202 to encrypt the nonce using the TPM public key and the IBE public key together to generate an IBE ciphertext. To encrypt the nonce, the processing resource 202 may compute an encryption key using an IBE scheme that combines the TPM public key and the IBE public key. In some implementations, combining the TPM public key and the IBE public key creates a third value to be used as an encryption key, which may be referred to as a joint IBE key. Alternatively, the TPM public key and the IBE public key may be directly used in the IBE encryption without first generating a joint IBE key. For example, an example of computing IBE encryption (and decryption) according to an IBE scheme may be described in ISO/IEC 18033-5:2015 "Information technology—Security techniques—Encryption algorithms—Part 5: Identity-based ciphers."

Instructions 214, when executed, cause the processing resource 202 to transmit a target device attestation request to the TPM. The target device attestation request includes the IBE ciphertext generated by instructions 212 and a retrieval index corresponding to the expected value designated by instructions 210. The apparatus 200 maintains the IBE public key and does not send the IBE public key to the TPM. The target device attestation request may serve as the target device attestation request 140 described above.

The retrieval index included in the target device attestation request is a location or address in TPM storage where the expected value is stored, located, or can be accessed. For example, if the expected value (and thus the IBE public key) is a target device PCR value, then the retrieval index is a PCR index. More particularly, the retrieval index is the PCR index of the TPM's PCR where the expected PCR value can be accessed or retrieved.

In some implementations, the retrieval index, as a location of the expected value, is agreed upon between the apparatus device 200 and the target device in advance of the executing instructions 206, 208, 210, 212, 214. In some cases, the retrieval index may be agreed upon between users, manufacturers, or other interested parties. For example, the manufacturer of the target device or of the TPM installed on the target device may provide a specification detailing PCR indices and PCR values, and the apparatus 200 may include a PCR index per the specification in the target device attestation request. In this manner, the target device can successfully locate and retrieve the expected value in a manner to be described below.

Figure 3:
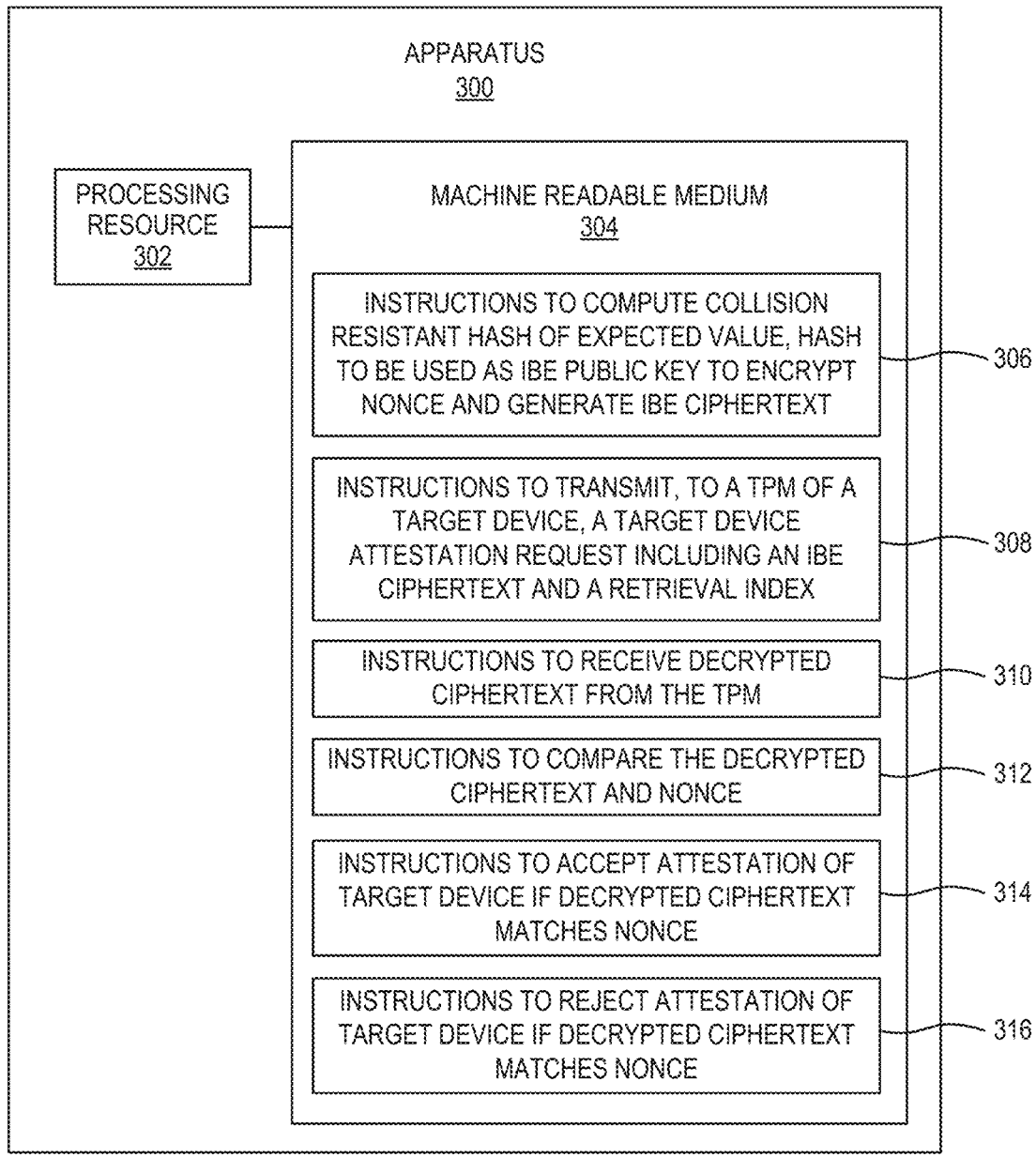
FIG. 3 is a block diagram depicting an example apparatus that transmits a device attestation request, according to another implementation.

FIG. 3 is a block diagram of an example apparatus 300 that transmits a device attestation request, according to an implementation. The apparatus 300 includes a processing resource 302 and a non-transitory machine readable medium 304, which may be analogous in many respects to the processing resource 202 and the non-transitory machine readable medium 204, respectively. The machine readable medium 304 may store instructions 306, 308, 310, 312, 314, 316.

As with apparatus 200, the apparatus 300 may be in communication with a target device by way of a wired and/or wireless network. In some implementations, the apparatus 300 may serve as or form part of the verifier device 110 described above. The target device may be analogous in many respects to the target device 120, and may include a TPM analogous to the TPM 130. The apparatus 200 may execute the instructions 206, 208, 210, 212, 214 to test the state of the target device and verify the trustworthiness of the target device. In some implementations, the instructions of the apparatuses 200 and 300 may be combined or executed in combination. For example, the apparatus 300 may, among other things, generate a nonce (e.g., instructions 206), retrieve a TPM public key from a TPM of the target device (e.g., instructions 208), and encrypt the nonce using the TPM public key and an IBE public key (e.g., instructions 212).

Instructions 306, when executed, cause the processing resource 302 to compute a collision resistant hash of an expected value. In some implementations, the collision resistant hash is computed by hashing an expected value using a hash algorithm, such as a SHA family algorithm. The collision resistant hash can be used as an IBE public key in combination with the TPM public key to encrypt a nonce (e.g., by execution of instructions 212 described above). The encrypted nonce can serve as an IBE ciphertext. Collision resistance will be described further below after describing the instructions of apparatus 300.

Instructions 308, when executed, cause the processing resource 302 to transmit, to a TPM of the target device, a target device attestation request that includes the IBE ciphertext and a retrieval index. Instructions 308 may be analogous in many respects to instructions 214 described above.

Instructions 310, when executed, cause the processing resource 302 to receive from the TPM a decrypted ciphertext. The decrypted ciphertext is the IBE ciphertext as decrypted by the TPM using an IBE decryption key extracted by the TPM using a TPM private key and a value retrieved by the TPM using the retrieval index. More particularly, the TPM may extract the IBE decryption key using the TPM private key and a collision resistant hash of the retrieved value. Extraction of the IBE decryption key by the TPM will be described further herein below, with respect to FIG. 6. The decrypted ciphertext serves as attestation of the target device in response to the attestation request.

Instructions 312, when executed, cause the processing resource 302 to compare the decrypted ciphertext received by instructions 310 and the nonce. Instructions 314, when executed, cause the processing resource 302 to accept attestation of the target device if the decrypted ciphertext matches the nonce. Instructions 316, when executed, cause the processing resource 302 to reject attestation of the target device if the decrypted ciphertext does not match the nonce. For example, in an implementation where a PCR value is used as an IBE public key in combination with the TPM public key to encrypt the nonce, then the decrypted ciphertext will match the nonce (and attestation is accepted) if the TPM is able to retrieve a matching PCR value stored on the TPM using the PCR index and decrypt the ciphertext using the PCR value as an IBE public key. Accordingly, the apparatus 300 (or a user thereof) is able to trust the state of the target device because the PCR value stored on the TPM is as expected.

Because attestation of the target device depends, at least in part, on the ability of the TPM to retrieve the correct IBE public key and correctly decrypt the IBE ciphertext, conferring collision resistance on the IBE public key by instructions 306 may be useful to prevent erroneous or inappropriate attestation by the TPM. The property of collision resistance means that two different inputs will not likely generate the same output. Thus, by using a collision resistant hash of the expected value as the IBE public key, any particular retrieval index may cause the TPM to extract an IBE decryption key for a unique IBE public key. Without collision resistance, some retrieval indicies may cause the TPM to unintentionally retrieve a correct expected value to decrypt the IBE ciphertext.

In some implementations, the expected value may already be a collision resistant hash. For example, PCR values are generally collision resistant hash chains. In such cases, the apparatus 300 may encrypt a nonce using the expected value (e.g., a PCR value) as the IBE public key without first computing a collision resistant hash of the expected value via instructions 306.

Figure 4:
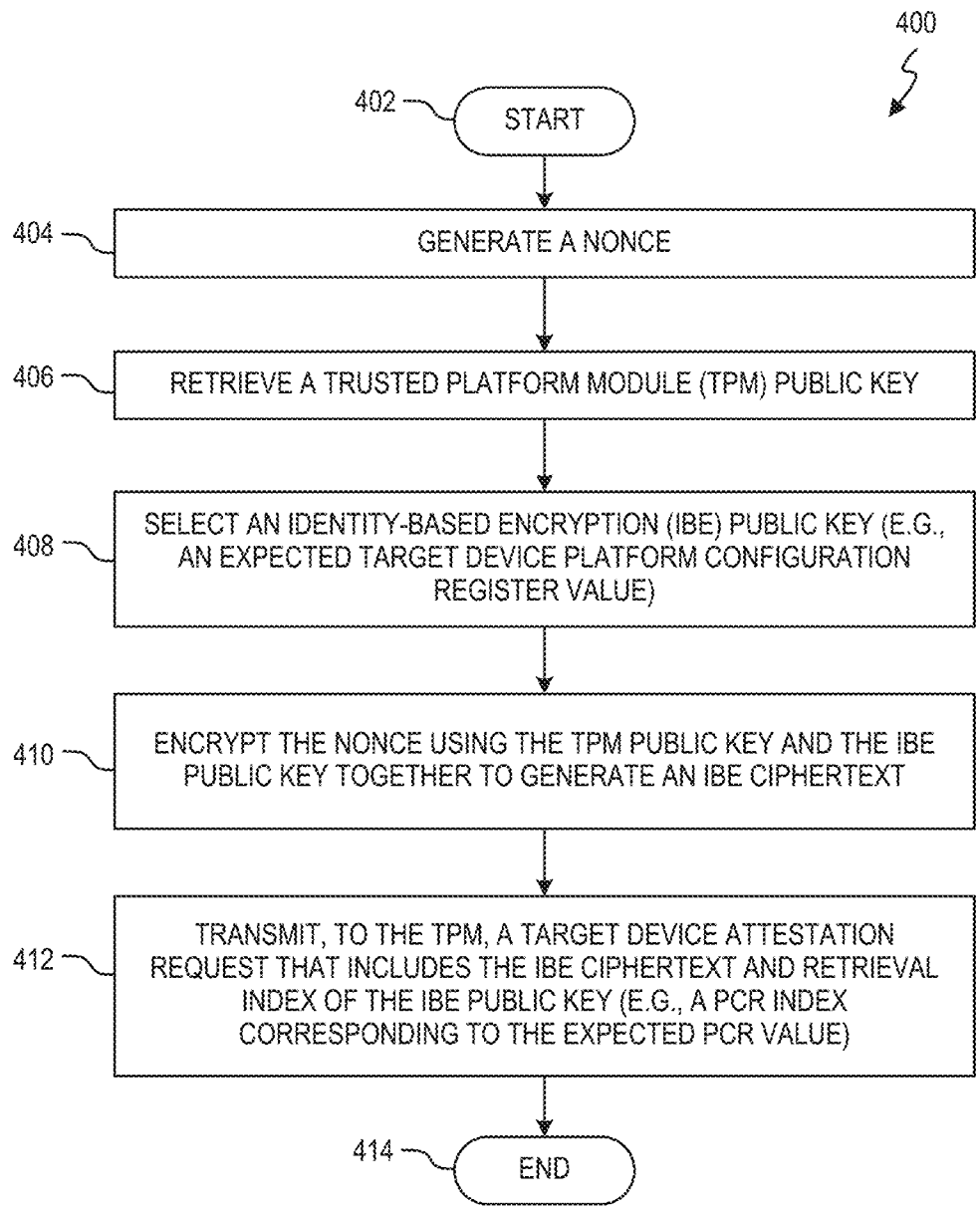
FIG. 4 is a flowchart of an example method for transmitting a device attestation request, according to an implementation.

FIG. 4 is a flowchart of an example method 400 for transmitting a device attestation request, according to an implementation. Method 400 may be implemented in the form of executable instructions stored on a machine readable medium and executed by a processing resource and/or in the form of electronic circuitry. For example, method 400 is described below as being performed a verifier device, such as the verifier device 110 of FIG. 1. Various other devices may perform method 400 as well, such as, for example, the apparatus 200 of FIG. 2 or the apparatus 300 of FIG. 3. In some implementations of the present disclosure, one or more blocks of method 400 may be executed substantially concurrently or in a different order than shown in FIG. 4. In some implementations, one or more of the blocks of method 400 may, at certain times, be ongoing and/or may repeat. In some implementations of the present disclosure, method 400 may include more or fewer blocks than are shown in FIG. 4.

The method 400 may begin at block 402, and continue to block 404, where a verifier device generates a nonce. At block 406, the verifier device retrieves a TPM public key from a TPM of a target device. For example, the TPM may be installed in the target device, and the verifier device may communicate with the target device and the TPM by way of a wired and/or wireless network connection.

At block 408, the verifier device selects an IBE public key based on an expected value. In some implementations, the IBE public key is or is based on an expected target device PCR value.

At block 410, the verifier device encrypts the nonce generated at block 404 using the TPM public key and the IBE public key together to generate an IBE ciphertext. In some implementations, the verifier device generates an encryption key using an IBE scheme that combines the TPM public key and the IBE public key, and the verifier device encrypts the nonce using that encryption key.

At block 412, the verifier device transmits to the TPM a target device attestation request that includes the IBE ciphertext generated by instructions 410 and a retrieval index. The retrieval index refers to a storage location on the TPM where the verifier device presumes an instance of the IBE public key is located. For example, the retrieval index may be a PCR index where a PCR value serves as the IBE public key at block 408. At block 414, the method 400 may end.

Figure 5:
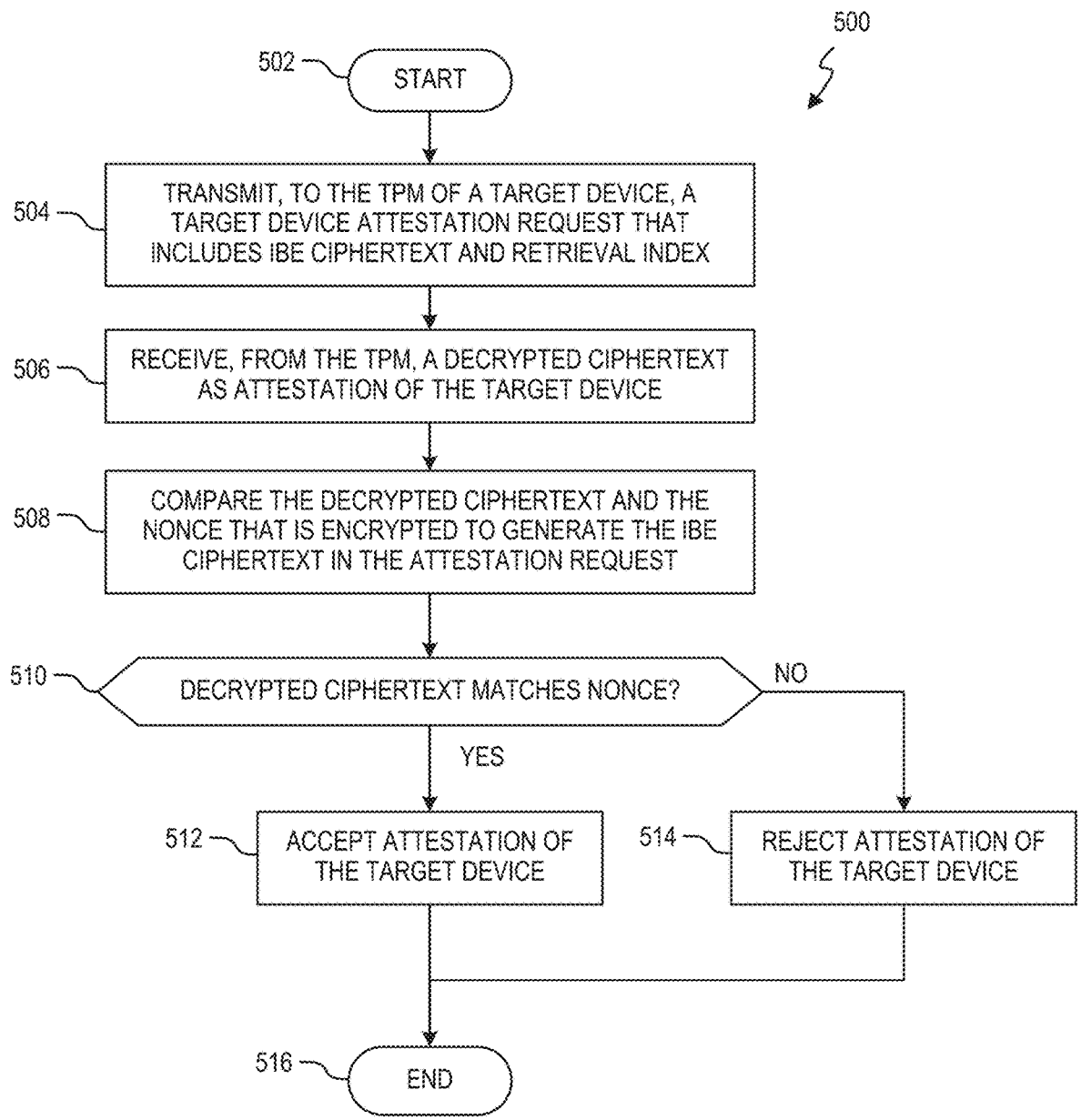
FIG. 5 is a flowchart of an example method for transmitting a device attestation request, according to another implementation.

FIG. 5 is a flowchart of an example method 500 for transmitting a device attestation request, according to another implementation. As with method 400, method 500 may be implemented in the form of executable instructions stored on a machine readable medium and executed by a processing resource and/or in the form of electronic circuitry. Method 500 may be performed, for example, by the verifier device 110 of FIG. 1. Various other devices may be used as well, such as, for example, the apparatus 300. In some implementations of the present disclosure, one or more blocks of method 500 may be executed substantially concurrently or in a different order than shown in FIG. 5. In some implementations of the present disclosure, method 500 may include more or fewer blocks than are shown in FIG. 5.

The method 500 may begin at block 502 and continue to block 504, where the verifier device transmits, to a TPM of a target device, a target device attestation request that includes an IBE ciphertext and a retrieval index (e.g., a PCR index). Block 504 may be analogous in many respects to block 412 of method 400. For example, the transmitted IBE ciphertext may be a nonce encrypted using a TPM public key and an IBE public key that is based on an expected value such as a target device PCR value.

At block 506, the verifier device receives, from the TPM, a decrypted ciphertext as attestation of the target device. The decrypted ciphertext may be transmitted by the TPM to the verifier device in response to the target device attestation request. The decrypted ciphertext is the IBE ciphertext as decrypted by the TPM using an IBE decryption key extracted by the TPM using elements stored on the TPM, namely a TPM private key and a value retrieved retrieved by the TPM from TPM storage using the retrieval index.

At block 508, the verifier device compares the decrypted ciphertext (received at block 506) and the nonce that is encrypted to generate the IBE ciphertext of the attestation request. If the decrypted ciphertext matches the nonce ("YES" at decision block 510), then the method proceeds to block 512 where the verifier device accepts attestation of the target device. If the decrypted ciphertext does not match the nonce ("NO" at decision block 510), then the method proceeds to block 514 where the verifier device rejects attestation of the target device. After block 512 and after block 514, the method 500 ends at block 516.

Figure 6:
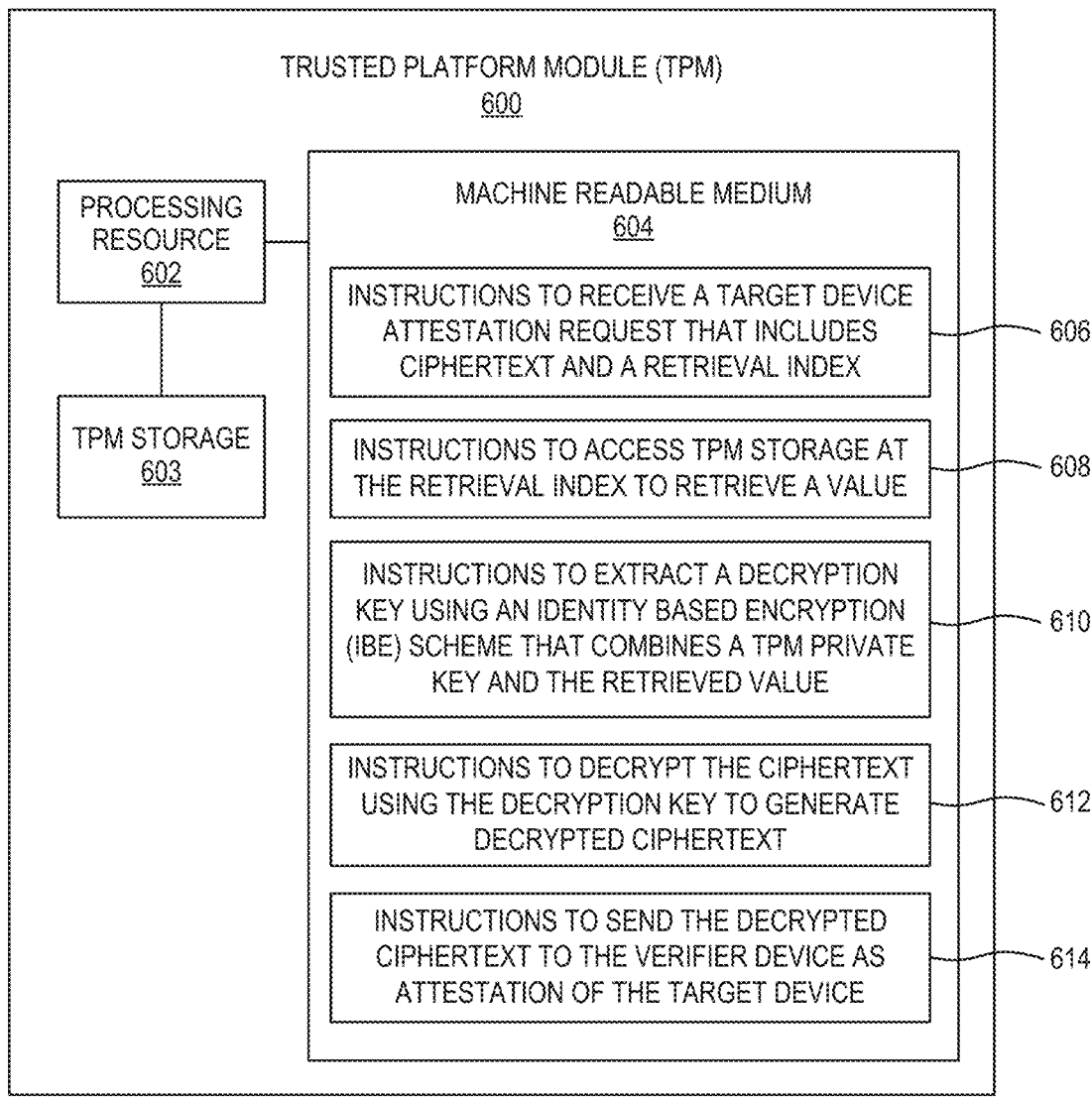
FIG. 6 is a block diagram of a trusted platform module that includes a non-transitory, machine readable medium encoded with example instructions to receive a target device attestation request, according to an implementation.

FIG. 6 is a block diagram of a trusted platform module (TPM) 600 that includes a non-transitory, machine readable medium encoded with example instructions to receive a target device attestation request, according to an implementation. In some implementations, the TPM 600 may include at least one processing resource 602 coupled to the machine readable medium 604. In some implementations, the TPM 600 may serve as or form part of any TPM described above, including TPM 130. Additionally, the TPM 600 may be installable in any target device described above, including the target device 120. The TPM 600 may communicate with a verifier device (such as 110), by way of, for example, a network connection through a target device (e.g., 120) in which the TPM 600 is installed.

The processing resource 602 may include a microcontroller, a microprocessor, central processing unit core(s), an ASIC, an FPGA, and/or other hardware device suitable for retrieval and/or execution of instructions from the machine readable medium 604 to perform or coordinate functions described below. Additionally or alternatively, the processing resource 602 may include or be coupled to electronic circuitry or dedicated logic for performing some or all of the functionality of the instructions described herein. For example, the processing resource 602 may include or be coupled to a hardware-based cryptographic engine (e.g., an RSA key generator) and/or a hardware-based hash generator (e.g., a SHA-1 hash generator).

The processing resource 602 also may access TPM storage 603. The TPM storage 603 may include persistent memory for storing information, such as cryptographic keys, including a TPM public key and TPM private key pair. Other stored information may include information that a verifier device requires the TPM to hold or be able to produce prior to communicating sensitive information. The TPM storage 603 also may include platform configuration registers that store PCR values related to a target device in which the TPM is installed.

The machine readable medium 604 may be any medium suitable for storing executable instructions, such as RAM, ROM, EEPROM, flash memory, a hard disk drive, an optical disc, or the like. In some example implementations, the machine readable medium 604 may be a tangible, non-transitory medium. The machine readable medium 604 may be disposed within the TPM 600, as shown in FIG. 6, in which case the executable instructions may be deemed installed or embedded on the TPM 600. Alternatively, the machine readable medium 604 may be a portable (e.g., external) storage medium, and may be part of an installation package.

As described further herein below, the machine readable medium 604 may be encoded with a set of executable instructions 606, 608, 610, 612, 614. It should be understood that part or all of the executable instructions and/or electronic circuits included within one box may, in alternate implementations, be included in a different box shown in the figures or in a different box not shown.

Instructions 606, when executed by the processing resource 602, receive from a verifier device, a target device attestation request that includes ciphertext and a retrieval index. For example, the target device attestation request may be analogous in many respects to the target device attestation requests described above with respect to the apparatus 200 and method 400.

Instructions 608, when executed by the processing resource 602, access TPM storage 603 at the retrieval index to retrieve a value. For example, the retrieval index may be a PCR index, and instructions 608 may retrieve a PCR value stored in the PCR at the PCR index. In some implementations, value retrieval by instructions 608 also includes computing a collision resistant hash of the value at the retrieval index, unless the value is already a collision resistant hash (e.g., a PCR value). The retrieved value, or a collision resistant hash thereof, is deemed an IBE public key for use by the TPM 600.

Instructions 610, when executed by the processing resource 602, extract a decryption key using an IBE scheme that combines a TPM private key and the IBE public key. The TPM private key may be retrieved by instructions 610 from TPM storage 603, and IBE public key is the value retrieved by instructions 608. In particular, extraction by instructions 610 may include digitally signing the IBE public key with the TPM private key to generate the decryption key (also referred to as an IBE decryption key).

Instructions 612, when executed by the processing resource 602, may decrypt the ciphertext received by instructions 606 using the decryption key extracted by instructions 610 to generate decrypted ciphertext. Instructions 614, when executed by the processing resource 602, may send the decrypted ciphertext to the verifier device as attestation of a target device in which the TPM is installed. The verifier device may then analyze the decrypted ciphertext to validate the attestation as described above with respect to method 500.

In view of the foregoing description, it can be appreciated that an electronic device (i.e., a target device) may attest to a verifier device in a privacy preserving manner. By virtue of using a value expected of the target device, such as a PCR value, as an IBE public key in an identity-based encryption scheme, the verifier device can test the integrity of the target device based on whether the target device has the expected value to correctly decrypt a nonce. Privacy of the target device is maintained because the attestation communications can be simulated on the verifier device and because the IBE public key may be public information, and thus the verifier device or a user thereof does not retain universally verifiable evidence to convince a third party about the configuration or identity of the target device. Moreover, the systems and techniques described herein achieve privacy preserving attestation efficiently between a verifier device and a target device without involving a third party, such as key manager or certificate authority.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed:

1. A verifier device comprising:
a processing resource; and
a non-transitory machine readable medium storing instructions executable on the processing resource to:
generate a nonce,
receive, at the verifier device from a trusted platform module (TPM) of a target device, a TPM public key,
designate an identity-based encryption (IBE) public key based on an expected value presumed to be stored at the TPM,
encrypt the nonce using the TPM public key and the IBE public key together to generate an IBE ciphertext,
transmit a target device attestation request from the verifier device to the TPM, the target device attestation request including the IBE ciphertext and a retrieval index corresponding to a storage location of the expected value at the TPM, receive, at the verifier device from the TPM in response to the target device attestation request, an attestation value derived by the TPM based on the IBE ciphertext and a value retrieved by the TPM from the storage location using the retrieval index, and determine that the attestation value indicates a trustworthiness of the target device responsive to the attestation value matching the nonce, wherein the attestation value matching the nonce corresponds to the value retrieved from the storage location using the retrieval index matching the expected value.

2. The verifier device of claim 1, wherein the instructions are executable on the processing resource to compute a collision resistant hash of the expected value, the IBE public key comprising the collision resistant hash.

3. The verifier device of claim 1, wherein the expected value is an expected target device platform configuration register (PCR) value, and the retrieval index is a PCR index representing where in the TPM the PCR value is stored.

4. The verifier device of claim 1, wherein the instructions are executable on the processing resource to encrypt the nonce based on computing an encryption key using an IBE scheme that combines the TPM public key and the IBE public key.

5. The verifier device of claim 1, wherein the instructions are executable on the processing resource to receive, at the verifier device from the TPM, a decrypted ciphertext that is the IBE ciphertext decrypted by the TPM using an IBE decryption key extracted by the TPM using a TPM private key and the value retrieved by the TPM from the storage location using the retrieval index, the decrypted ciphertext serving as an attestation of the target device in response to the target device attestation request, wherein the attestation value comprises the decrypted ciphertext.

6. The verifier device of claim 5, wherein the instructions are executable on the processing resource to compare the decrypted ciphertext and the nonce.

7. The verifier device of claim 5, wherein the instructions are executable on the processing resource to accept the attestation of the target device responsive to the decrypted ciphertext matching the nonce.

8. The verifier device of claim 6, wherein the instructions are executable on the processing resource to reject the attestation of the target device responsive to the decrypted ciphertext not matching the nonce.

9. A method comprising:
generating, by a verifier device, a nonce;
retrieving, by the verifier device, a trusted platform module (TPM) public key from a TPM of a target device;
selecting, by the verifier device, an expected target device platform configuration register (PCR) value as an identity-based encryption (IBE) public key,
encrypting, by the verifier device, the nonce using the TPM public key and the IBE public key together to generate an IBE ciphertext;
transmitting, by the verifier device and to the TPM, a target device attestation request that includes the IBE ciphertext and a PCR index corresponding to the expected target device PCR value;
receiving, at the verifier device from the TPM in response to the target device attestation request, an attestation value derived by the TPM based on the IBE ciphertext and a value retrieved by the TPM from a TPM storage location identified by the PCR index; and determining, at the verifier device, that the attestation value indicates a trustworthiness of the target device responsive to the attestation value matching the nonce, wherein the attestation value matching the nonce corresponds to the value retrieved from the TPM storage location identified by the PCR index matching the expected target device PCR value.

10. The method of claim 9, further comprising receiving, by the verifier device and from the TPM, a decrypted ciphertext as an attestation of the target device, the decrypted ciphertext being the IBE ciphertext decrypted by the TPM using an IBE decryption key extracted by the TPM using a TPM private key and the value retrieved by the TPM from TPM storage addressed by the PCR index.

11. The method of claim 9, further comprising generating, by the verifier device, an encryption key using an IBE scheme that combines the TPM public key and the IBE public key,
wherein the encrypting the nonce is performed using the encryption key.

12. The method of claim 10, further comprising:
comparing, by the verifier device, the decrypted ciphertext and the nonce; and
accepting, by the verifier device, the attestation of the target device responsive to the decrypted ciphertext matching the nonce.

13. The method of claim 10, further comprising:
comparing, by the verifier device, the decrypted ciphertext and the nonce; and
rejecting, by the verifier device, the attestation of the target device responsive to the decrypted ciphertext not matching the nonce.

14. A non-transitory machine readable medium storing instructions that upon execution by a processing resource of a trusted platform module (TPM) installed in a target device, cause the TPM to:
receive, from a verifier device, a target device attestation request that includes a ciphertext and a retrieval index;
send, to the verifier device, a TPM public key, wherein the ciphertext in the target device attestation request is encrypted using the TPM public key and an identity-based (IBE) public key based on an expected value at a TPM storage of the TPM;
access the TPM storage of the TPM using the retrieval index to retrieve a value;
extract a decryption key using an IBE scheme that combines a TPM private key and the retrieved value, the retrieved value serving as the IBE public key;
decrypt the ciphertext using the decryption key to generate decrypted ciphertext; and
send, in response to the target device attestation request, the decrypted ciphertext to the verifier device as an attestation of the target device.

15. The non-transitory machine readable medium of claim 14, wherein the retrieval index is a platform configuration register (PCR) index, and the value is a PCR value.

16. The verifier device of claim 1, wherein the IBE public key is based on a hash of the expected value.

17. The verifier device of claim 1, wherein the expected value at the storage location of the TPM comprises a configuration of programs of the target device.

* * * * *